3,265,715
TETRAHYDRO-2,4,4-TRIMETHYLFURFURYL
ALCOHOL AND ESTERS THEREOF
William H. Moore and Wayne V. McConnell, Kingsport,
Tenn., assignors to Eastman Kodak Company, Rochester, N.Y., a corporation of New Jersey
No Drawing. Filed Sept. 9, 1964, Ser. No. 395,309
14 Claims. (Cl. 260—347.4)

This invention relates to new chemical compounds and to processes for their preparation. More particularly it relates to tetrahydro-2,4,4-trimethylfurfuryl alcohol and to carboxylic acid esters thereof and to processes for preparing the new compounds of the invention.

The new compounds of the invention are represented by the formulas:

I.
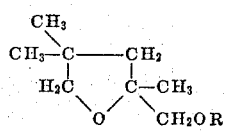

and

II.
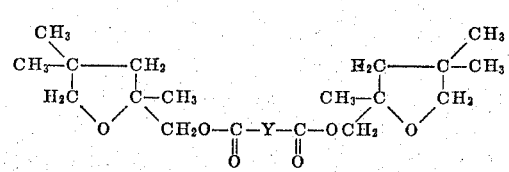

wherein R represents hydrogen or

wherein X represents alkyl, cycloalkyl, phenyl, alkylphenyl, alkoxyphenyl, halophenyl or nitrophenyl, and Y represents o-phenylene, m-phenylene, p-phenylene, tetrahydrophenylene, hexahydrophenylene or $(CH_2)_n$, wherein $n$ stands for a whole number from 1 to 8.

When X is alkyl it can be an alkyl radical having 1 to 17 carbon atoms such as methyl, ethyl, propyl, isopropyl, butyl, isobutyl, pentyl, hexyl, heptyl, octyl, nonyl, decyl, hendecyl, dodecyl, cetyl and heptadecyl. Illustrative alkylphenyl groups are o-tolyl, m-tolyl, p-tolyl, o-ethylphenyl, m-ethylphenyl and p-ethylphenyl. Illustrative alkoxyphenyl groups are (o-, m-, p-)-methoxyphenyl, (o-, m-, p-)ethoxyphenyl, (o-, m-, p-)propoxyphenyl and (o-, m-, p-)butoxyphenyl. Illustrative halophenyl groups are (o-, m-, p-)chlorophenyl, (o-, m-, p-)bromophenyl and (o-, m-, p-)fluorophenyl. The nitrophenyl group can be o-nitrophenyl, m-nitrophenyl or p-nitrophenyl.

In accordance with one of the novel processes of our invention tetrahydro-2,4,4-trimethylfurfuryl alcohol is obtained by the oxidation of 2,2,4-trimethyl-4-penten-1-ol with an organic peroxide, such as peroxyacetic acid. This process is illustrated by the following equation.

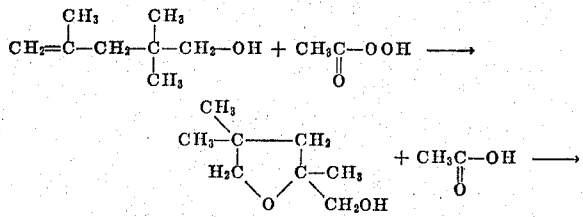

This result is surprising because under the conditions stated the expected product would be 4,5-epoxy-2,2,4-trimethylpentanol.

Another novel process for preparing tetrahydro-2,4,4-trimethylfurfuryl alcohol is by the saponification of 4,5-epoxy-2,2,4-trimethylpentyl carboxylic acid ester compounds. This process is illustrated by the following equation.

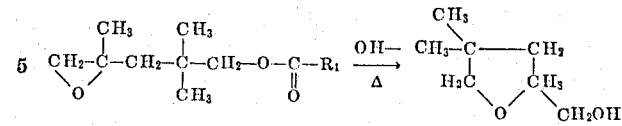

wherein $R_1$ represents alkyl, cycloalkyl or a monocyclic aryl nucleus.

The 4,5-epoxy-2,2,4-trimethylpentyl carboxylic acid ester compounds referred to in the preceding paragraph are obtained by treating the corresponding carboxylic acid esters of 2,2,4-trimethyl-4-penten-1-ol with peroxyacetic acid.

The epoxidation reaction referred to in the preceding paragraph can be carried out at temperatures ranging from 10° C. to 70° C., preferably a temperature ranging from 25° C. to 30° C. Other organic peroxides such as peroxybenzoic, monoperoxyphthalic, peroxymaleic, etc., can be employed as the oxidizing agent.

The new carboxylic acid esters of tetrahydro-2,4,4-trimethylfurfuryl alcohol of our invention are obtained from tetrahydro-2,4,4-trimethylfurfuryl alcohol by the usual esterification procedures employed in the art. The alcohol is heated with the anhydride of the appropriate lower aliphatic acid in the presence of potassium carbonate to yield the ester; or the alcohol is treated with the acid in the presence of an appropriate esterification catalyst in an inert solvent, with provision for water separation and removal from the system. Catalysts such as p-toluenesulfonic acid, sulfuric acid and alkyl orthotitanates, for example, are effective and solvents such as benzene, toluene, or the xylenes, for example, can be used. Temperatures ranging from 80° C. to 225° C. can be utilized; temperature and solvent requirements are dependent on the solubility characteristics of the reactants.

Tetrahydro-2,4,4-trimethylfurfuryl esters of monocarboxylic acids can also be obtained directly from the 4,5-epoxy-2,2,4-trimethylpentyl carboxylic acid compaunds just mentioned by means of a novel acid catalyzed rearrangement. The aldehydic ester compounds obtained as a co-product in the rearrangement reaction are described and claimed in our copending U.S. application Serial No. 395,028, filed September 8, 1964. The rearrangement reaction is set forth hereinafter.

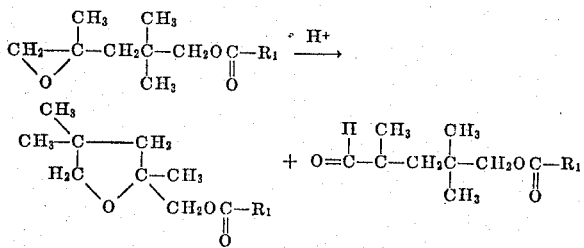

wherein $R_1$ represents alkyl, cycloalkyl or a monocyclic aryl nucleus.

The rearrangement reaction referred to in the preceding paragraph was found to occur very rapidly, and was generally exothermic. Generally, the epoxy compound was dissolved in an inert diluent and the solution resulting was added to a solution of the acid catalyst in the same diluent. The temperature range employed was 10°–150°, and catalysts such as p-toluenesulfonic acid, alkanemonosulfonic acids such as methanesulfonic acid and ethanesulfonic acid, alkanedisulfonic acids such as methanedisulfonic acid, 1,2-ethanedisulfonic acid and 1,2-propanedisulfonic acid, strongly acidic ion exchange resins of the polystyrene sulfonic type and boron fluoride were effective. Generally, however, the use of boron fluoride as the catalyst in combination with low reaction temperature afforded the best yields of the tetrahydrofurfuryl ester. The use of other acid catalysts or the use of boron fluoride at higher temperatures generally resulted in the formation of larger amounts of the aldehydic ester co-product. At the higher temperature ranges, the aldehydic ester was the major product.

Aliphatic hydrocarbons such as heptane, isooctane and petroleum naphtha, alicyclic hydrocarbons such as cyclohexane, cycloheptane and cyclopentane, aromatic hydrocarbons such as benzene, toluene and xylene, ethers such as dioxane, di-n-butyl ether and di-isopropyl ether, chlorinated hydrocarbons such as chloroform and tetrachlorethane, acetonitrile, and an ester such as ethyl acetate are illustrative, but not limitative, of the diluents that can be employed.

The following examples illustrate the invention.

Example 1

A mixture of 2,2,4-trimethyl-4-penten-1-ol (25.6 parts) and anhydrous sodium acetate (2 parts) was stirred vigorously and cooled to 20° C. by means of an ice-water bath. A commercial solution of peroxyacetic acid (40% by weight) (40 parts) was added dropwise during one hour, maintaining the temperature at 20–25° C. When addition was completed, the reaction mixture was stirred for an additional 2½ hours at 23–25° C., then poured into two volumes of water. The resulting clear solution was neutralized to pH 6 with solid sodium carbonate, causing separation of an oil. The oil was dissolved in 100 ml. of ether, washed with 5% sodium bicarbonate solution, then water, and dried over sodium sulfate. Evaporation of the ether and distillation of the residue yielded tetrahydro-2,4,4-trimethylfurfuryl alcohol (17.7 parts) boiling at 71–73° C. (7.3 mm.).

Analysis.—Calcd. for $C_8H_{16}O_2$: C, 66.6; H, 11.2. Found: C, 66.4; H, 11.1; $n_D^{2°}$ 1.4411.

Example 2

4,5-epoxy-2,2,4-trimethylpentyl isobutyrate (642 parts) was saponified with a solution (1600 parts) of 10% sodium hydroxide in a 1:1 mixture of water and methanol. The mixture was refluxed for 0.5 hr. and was then neutralized with sulfuric acid. The volume of the reaction mixture was reduced to 1200 parts by distillation of the low boilers. After cooling, the residue was extracted continuously with ether (800 parts). Upon distillation of the ethereal solution, tetrahydro-2,4,4-trimethylfurfuryl alcohol of excellent quality was obtained as the fraction (362 parts) distilling at 70–72° C. (7.8 mm.).

Analysis.—Calcd. for $C_8H_{16}O_2$: C, 66.6; H, 11.2. Found: C, 66.4; H, 10.9; $n_D^{2°}$ 1.4409.

Example 3

A mixture of tetrahydro-2,4,4-trimethylfurfuryl alcohol (57.6 parts) and anhydrous potassium carbonate (20 parts) was stirred and warmed to 70° C. Isobutyric anhydride (70 parts) was added rapidly during 30 minutes; the temperature rose to 90° C. The mixture was stirred at 90–95° C. for 4½ hours, then cooled to 50° C. and added to an equal volume of water. The separated organic layer was dissolved in ether (250 ml.), and the ethereal solution washed successively with 5% sodium bicarbonate solution and water, and dried over magnesium sulfate. After evaporation of the ether, the residue was distilled to give tetrahydro-2,4,4-trimethylfurfuryl isobutyrate (61 parts) in the fraction boiling at 83–85° C. (3.5 mm.).

Analysis.—Calcd. for $C_{12}H_{16}O_3$: C, 67.3; H, 10.3. Found: C, 67.7; H, 10.1; $n_D^{2°}$ 1.4329.

Example 4

A mixture of tetrahydro-2,4,4-trimethylfurfuryl alcohol (72 parts), stearic acid (72 parts) and butyl orthotitanate (0.1 g.) was stirred vigorously in a reaction flask equipped with a 10″ packed column topped by a distillation head. The mixture was heated at 185–205° C. for 4 hours, during which time 96% of the theoretical amount of water was distilled. The excess alcohol was removed by distillation under reduced pressure, leaving the tetrahydro-2,4,4-trimethylfurfuryl stearate (93 parts) as a viscous yellow-brown oil; acid number, 16. Purification was effected by dissolving the ester in isopropyl acetate and washing with 5% sodium carbonate solution. This treatment reduced the acid number to 4.1.

Example 5

A mixture of tetrahydro-2,4,4-trimethylfurfuryl alcohol (43.2 parts), sebacic acid (20.2 parts) and butyl orthotitanate (0.1 part) was heated in a flask equipped with a 12″ Vigreux column topped by a distillation head. After heating for 7 hours at a pot temperature of 195–205° C., a total of 3.1 ml. of distillate was collected; the head temperature ranged from 45° C. to 110° C. The excess alcohol was distilled under reduced pressure (2 mm.) with the pot temperature being gradually raised to 150° C. The residual bis(tetrahydro-2,4,4-trimethylfurfuryl) sebacate (36.2 parts) was a viscous oil; acid number, 32. Treatment with sodium carbonate solution as in Example 4, yielded 32.5 parts of product with an acid number of 6.2.

Example 6

Following the procedure of Example 5, tetrahydro-2,4,4-trimethylfurfuryl alcohol (86.4 parts) was reacted with adipic acid (29.2 parts) and butyl orthotitanate (0.2 part) to give bis(tetrahydro-2,4,4-trimethylfurfuryl) adipate (67 parts) having an acid number of 5.1 after sodium carbonate treatment.

Example 7

A mixture of tetrahydro-2,4,4-trimethylfurfuryl alcohol (144 parts), phthalic anhydride (74 parts), xylene (100 parts) and butyl orthotitanate (0.3 part) was heated in a flask equipped with a 20″ packed column topped by a water separator and condenser. After 20 hours at a pot temperature of 158–166°, 18.7 parts (97% of theory) of water was separated from the reaction. The mixture was cooled, washed with 5% sodium bicarbonate solution and the xylene distilled under reduced pressure. The residual bis(tetrahydro-2,4,4-trimethylfurfuryl)phthalate (182 parts) was a pale yellow oil; acid number, 4.3.

Example 8

Proceeding as in Example 7, tetrahydrophthalic anhydride (76 parts) was reacted with tetrahydro-2,4,4-trimethylfurfuryl alcohol (144 parts) to give bis(tetrahydro-2,4,4-trimethylfurfuryl)tetrahydrophthalate (173 parts); acid number, 6.8.

Example 9

A solution (50 ml.) of 5% (w./v.) boron fluoride etherate in benzene was cooled to 10° C. with vigorous stirring. A solution of 4,5-epoxy-2,2,4-trimethylpentyl isobutyrate (50 grams) in benzene (100 grams) was added during 20 minutes, keeping the temperature at 10±2° C. The reaction was complete when the epoxy compound was added. The reaction mixture was washed successively with sodium acetate solution and water, then dried over magnesium sulfate. After the solvent was evaporated, fractionation yielded tetrahydro-2,4,4-trimethylfurfuryl isobutyrate (33 grams) in a fraction boiling at 87–92° C. (5 mm.). 5-oxo-2,2,4-trimethylpentyl isobutyrate (12 grams) was obtained as a co-product in a fraction boiling at 102–106° (5 mm.).

Example 10

Following the procedure in Example 9, 4,5-epoxy-2,2,4-trimethylpentyl acetate (18.6 parts) was added to boron fluoride etherate (1 part) in benzene (40 parts) to give tetrahydro-2,4,4-trimethylfurfuryl acetate (10 parts) in a fraction boiling at 73–77° C. (5 mm.). In this preparation, the aldehydic ester was not isolated in the pure form, but was identified in a higher boiling fraction by means of gas chromatography.

Example 11

Proceeding as in Example 9, 4.5-epoxy-2,2,4-trimethylpentyl benzoate (24.8 parts) was added to boron fluoride etherate (1 part) in benzene (40 parts) to give tetrahydro-2,4,4-trimethylfurfuryl benzoate (14 parts) in a fraction boiling at 109–116° (1mm.).

The foregoing examples are intended to be illustrative and not limitative of the compounds and processes of our invention. Other carboxylic acid ester forms of the ester compounds of our invention can be readily prepared. To illustrate, the benzoate or cyclohexanecarboxylate ester forms, for example, of the compound of Example 3 can be prepared.

Tetrahydro-2,4,4-trimethylfurfuryl alcohol is useful as an intermediate for the preparation of 2,2,4-trimethyl-1,5-pentanediol, a new compound, which is described and claimed in our copending U.S. application Ser. No. 395,895, filed September 11, 1964. The preparation of 2,2,4-trimethyl-1,5-pentanediol follows.

Example 12

A mixture of tetrahydro-2,4,4-trimethylfurfuryl alcohol (260 parts) and copper chromite catalyst (Harshaw Cu–1106 P) (40 parts) was heated for 15 hrs. in a stirred autoclave at 250° C. under 5000 p.s.i. hydrogen pressure. The catalyst was then removed by filtration and the reaction mixture was then distilled. 2,2,4-trimethyl-1,5-pentanediol was obtained in the fraction (112 parts) distilling at 93–97° C. (1.2 mm.); $n_D^{2°}$ 1.457.

The new ester compounds of our invention are useful as plasticizers for poly(vinyl chloride)resins.

We claim:

1. A compound having a formula selected from the formulas:

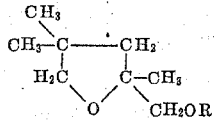

and

II.

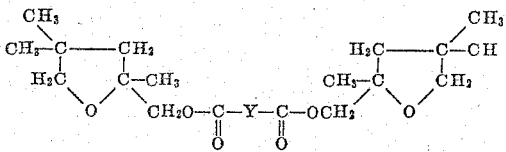

wherein R represents a member selected from hydrogen and

wherein X represents a member selected from alkyl having 1 to 17 carbon atoms, cyclohexyl, phenyl, methylphenyl, ethylphenyl, (alkoxy having 1 to 4 carbon atoms)-phenyl, halophenyl and nitrophenyl and Y represents a member selected from o-phenylene, m-phenylene, p-phenylene, tetrahydrophenylene, hexahydrophenylene and $(CH_2)_n$, wherein $n$ represents a whole number from 1 to 8.

2. A compound of claim 1 having the Formula I.
3. A compound of claim 1 having the Formula II.
4. A compound having the formula:

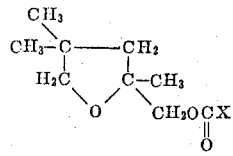

wherein X is alkyl.

5. A compound of claim 1 having the Formula II and wherein Y is tetramethylene.
6. Tetrahydro-2,4,4-trimethylfurfuryl alcohol.
7. Tetrahydro-2,4,4-trimethylfurfuryl isobutyrate.
8. Tetrahydro-2,4,4-trimethylfurfuryl stearate.
9. Bis(tetrahydro-2,4,4-trimethylfurfuryl) adipate.
10. Bis(tetrahydro-2,4,4-trimethylfurfuryl) o-phthalate.
11. The process for preparing tetrahydro-2,4,4-trimethylfurfuryl alcohol which comprises oxidizing 2,2,4-trimethyl-4-penten-1-ol with an organic peroxide.
12. Process in accordance with claim 11 wherein the organic peroxide is peroxyacetic acid.
13. The process for preparing tetrahydro-2,4,4-trimethylfurfuryl alcohol which comprises saponifying a compound having the formula:

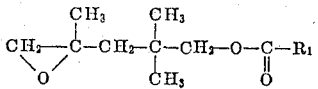

wherein $R_1$ represents a member selected from alkyl, cycloalkyl and a monocyclic aryl nucleus.

14. Process in accordance with claim 13 wherein $R_1$ is alkyl.

References Cited by the Examiner

UNITED STATES PATENTS 3,133,091  5/1964  Moore et al. _____ 260—347.8
3,184,480  5/1965  McConnell et al. ___ 260—347.4

OTHER REFERENCES

McConnell, et al.: Journal of Organic Chemistry, volume 28, 1963, pages 822–827.

NICHOLAS S. RIZZO, *Primary Examiner.*

HENRY R. JILES, *Examiner.*

J. H. TURNIPSEED, *Assistant Examiner.*